No. 795,038. PATENTED JULY 18, 1905.
A. L. HERKENHOFF.
BELT TIGHTENER.
APPLICATION FILED SEPT. 27, 1904.
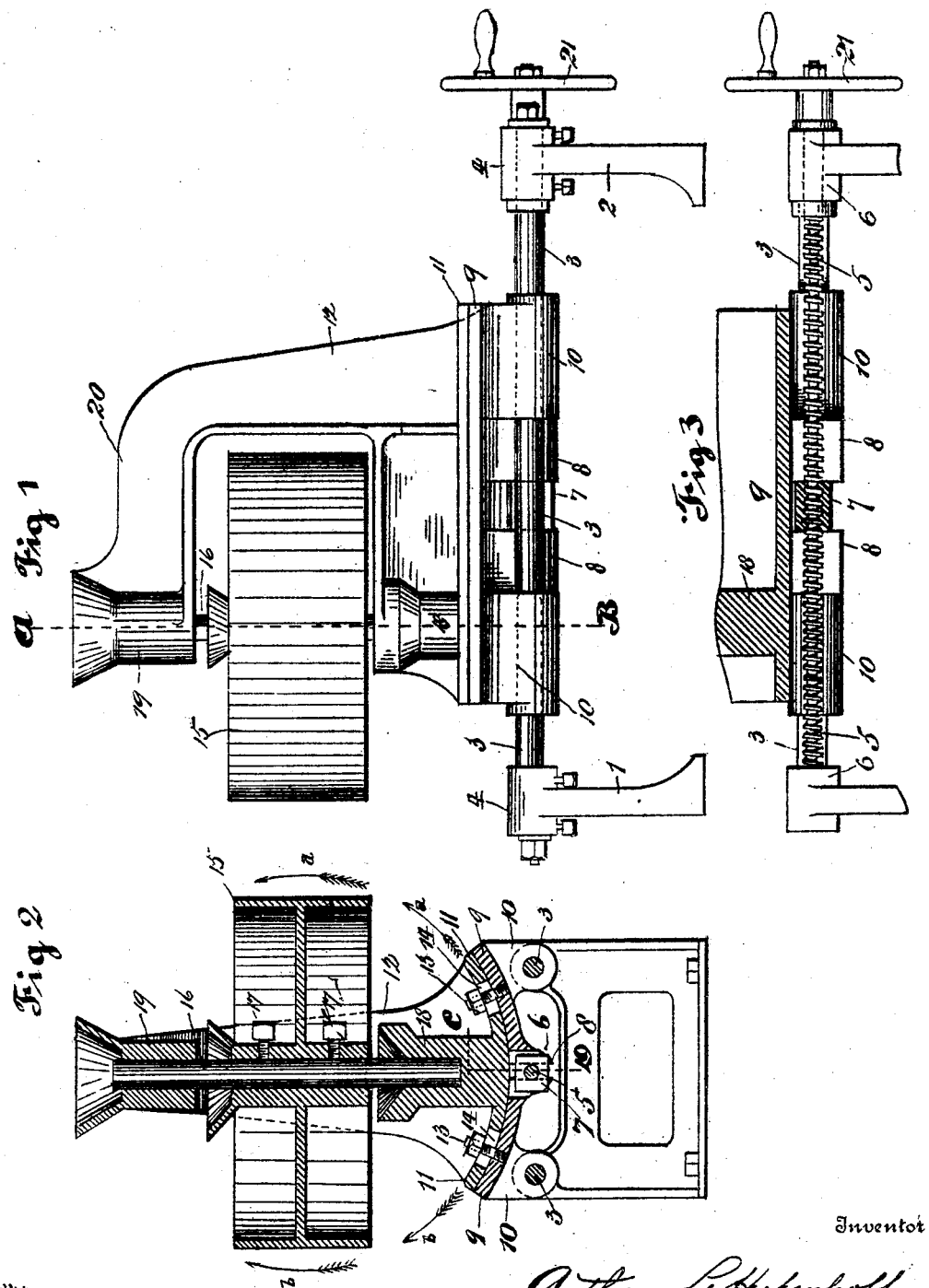

No. 795,038. Patented July 18, 1905.

UNITED STATES PATENT OFFICE.

ANTHONY L. HERKENHOFF, OF MINSTER, OHIO.

BELT-TIGHTENER.

SPECIFICATION forming part of Letters Patent No. 795,038, dated July 18, 1905.

Application filed September 27, 1904. Serial No. 226,195.

*To all whom it may concern:*

Be it known that I, ANTHONY L. HERKENHOFF, a citizen of the United States, residing at Minster, in the county of Auglaize and State of Ohio, have invented certain new and useful Improvements in Belt-Tighteners, of which the following is a specification, reference being had therein to the accompanying drawings.

This invention relates to improvements in belt-tighteners, particularly that class of belt-tightener used in connection with driving-belts for driving power-pumps in oil-fields; and it consists in the arrangement and the construction of the supporting-frame hereinafter more fully described, and particularly pointed out in the claims.

The object of this invention is to provide a means of adjusting the pulley to any desired angle to conform with the angularity of the driving-belt to which the tightening-pulley is applied and which means of adjustment is entirely independent of the means for traversing the pulley nearer to and farther from the belt. I attain this object by means of the mechanism illustrated in the accompanying drawings, in which similar numerals of reference designate like parts throughout the several views.

Figure 1 is a side elevational view of my belt-tightening pulley and supporting-frame. Fig. 2 is a transverse sectional view of the same, taken through the line A B, (see Fig. 1;) and Fig. 3 is a broken longitudinal sectional view of a portion of the lower supporting-frame, taken through the line C D (see Fig. 2) and showing the traversing screw.

The outside supporting-standards 1 and 2 are secured firmly in position upon a suitable foundation embedded in the ground. The parallel horizontally-extending guide-rods 3 are truly turned to a uniform diameter throughout their lengths and have their ends turned to fit and to be secured in the bosses 4, formed on the top outer ends of said standards 1 and 2. Intermediate the guide-rods 3 is situated the traversing screw 5, which has its ends journaled in the bearings 6, (see Figs. 2 and 3,) formed integral on the top ends of the standards 1 and 2 in position thereon intermediate the bosses 4, and the said traversing screw is screwed into the traversing-carriage nut 7, which traversing nut is loosely held in position between the lugs 8, formed integral on the bottom side of the traversing carriage 9.

The traversing carriage 9 is provided with the guide-lugs 10, which are bored to receive the guide-rods 3, upon which said carriage slides freely. The carriage 9 is preferably of a segmental form with its concave surface turned upwardly, which surface is truly formed to receive and accurately fit the convex surface of the base 11 of the pulley-supporting standard 12, and the bearing-surfaces of said standard-base and traversing carriage conform with an arc the center of which is the intersection of the axis of the convex base with the axis of the pulley and which point is situated on the axis of said pulley centrally with the face thereof, and the axis of the arc of said base is preferably at right angles with the axis of said pulley. The base 11 is securely bolted to the carriage 9 by the bolts 13.

The bolt-holes 14 are slotted, as shown particularly in Fig. 2, thereby permitting the base 11 of the standard 12 to be moved in the direction of either of the arrows *a* or *b*, as desired, to adjust the face of the pulley 15 to any desired angle to conform with the direction or angle of the drive-belt to which said pulley 15 is applied. The pulley 15, which may be of any suitable form of construction or type, is held securely on the shaft 16 by the set-screw 17. The shaft 16 has its bottom end journaled in the footstep-bearings 18, formed integral on the upper side of the base 11, and the said shaft has its top end journaled in the overhanging bearing 19, formed integral on the free end of the arm 20 of the standard 12.

The traversing carriage 9 and all the parts connected thereto, together with the tightening-pulley 15, is traversed nearer to or farther from the belt to be tightened by means of the traversing screw 5, previously described, operated by the hand-wheel 21.

The main feature of this invention consists in the method of constructing the base and the traversing carriage of the belt-tightener, whereby the pulley is adjusted to any angle, and which means consists in constructing the top bearing-surface of the carriage to conform with an arc of the circle struck from the center or swinging point of adjustment of the pulley. It is clear by an arrangement of this kind the center of the contacting face of the belt-tightening pulley, which is set to contact with the slack side of a drive-belt, will never vary with respect to the center of the belt when once set, but will be always maintained at a fixed point, so that when the said belt-tightening pulley is set in proper position to and against the belt to be tightened this initial or primary position will still be maintained, provided, of course, the guide-rods 3 are properly supported in horizontal position.

Having thus fully described this my invention, what I claim as new and useful, and desire to cover by Letters Patent of the United States therefor, is—

1. In a belt-tightener, the combination with a guide-pulley and its supporting-standard, a standard-base having a longitudinally-extending convex under bearing-surface, of a traversing carriage provided with an upper concave surface the direction of the axis of which surface is at right angles to the axis of said pulley but parallel to the path of the traversing carriage, and whereto the convex under surface of said standard-base is fitted, means for securing said standard-base to said carriage, parallel-extending traversing-carriage guides situated at each side of said carriage and means for traversing said carriage on said guides.

2. In a belt-tightener, the combination with a guide-pulley and its supporting-standard, a standard-base the under longitudinally-extending convex surface of which conforms to an arc of a circle having its axes passing through and at right angles with the axis of said pulley but parallel to the path of the traversing carriage, of a traversing carriage provided with an upper concave surface whereto the convex under surface of said standard-base is fitted, means for adjustably securing said standard-base to said carriage, parallel-extending traversing-carriage guides situated at each side of and beneath said carriage and means for traversing said carriage on said guides.

3. In a belt-tightener, the combination with a guide-pulley and its supporting-standard, a standard-base the under longitudinally-extending convex surface of which conforms to an arc of a circle having its axes passing through and at right angles with the axis of said pulley but parallel to the path of the traversing carriage, of a traversing carriage provided with an upper concave surface whereto the convex under surface of said standard is fitted, means for adjustably securing said standard-base to said carriage, parallel-extending traversing-carriage guides situated at each side of and beneath said carriage and means for traversing said carriage on said guides.

4. In a belt-tightener, the combination with a guide-pulley and its supporting-standard, a standard-base the under longitudinally-extending convex surface of which conforms to an arc of a circle having its axes passing through and at right angles with the axis of said pulley but parallel to the path of the traversing carriage, of a traversing carriage provided with an upper concave surface whereto the convex under surface of said standard-base is fitted, means for adjustably securing said standard-base to said carriage, horizontally-extending parallel guide-rods supported at their ends and situated beneath said carriage, and a traversing screw situated and extending longitudinally and horizontally between said guide-rods.

5. In a belt-tightener, the combination with a guide-pulley and its supporting-standard, a standard-base the under longitudinally-extending convex surface of which conforms to an arc of a circle having its axes passing through and at right angles with the axis of said pulley but parallel to the path of the traversing carriage, of a traversing carriage provided with an upper concave surface whereto the convex under surface of said standard-base is fitted, means for adjustably securing said standard-base to said carriage, horizontally-extending parallel guide-rods supported at their ends and situated beneath said carriage, guide-rods supporting housings, and a revoluble traversing screw, suitable bearing for supporting said screw, a traversing-screw nut and traversing-screw-nut-engaging lugs situated on the under side of said traversing carriage.

In testimony whereof I affix my signature in presence of two witnesses.

ANTHONY L. HERKENHOFF.

Witnesses:
    JULIUS DILLMAN,
    JOSEPH H. LAUFERSWEILER.